(12) United States Patent
Dupeux et al.

(10) Patent No.: US 10,739,540 B2
(45) Date of Patent: Aug. 11, 2020

(54) ASSEMBLY FOR CONNECTING A PLUG TO AN ELECTRONIC DEVICE HOUSING PANEL BASEPLATE, INTEGRATING A THERMAL REGULATION MEANS, AND ASSOCIATED PLUG AND BASEPLATE

(71) Applicant: RADIALL SA, Aubervilliers (FR)

(72) Inventors: M. Benoît Dupeux, Vatilieu (FR); Dominique Lomuscio, Sillans (FR); Fabien Bourgeas, Saint Nicolas de Macherin (FR); Vivien Badique, Wettolsheim (FR)

(73) Assignee: RADIALL SA, Aubervilliers (FR)

( * ) Notice: Subject to any disclaimer, the term of this patent is extended or adjusted under 35 U.S.C. 154(b) by 0 days.

(21) Appl. No.: 15/914,090

(22) Filed: Mar. 7, 2018

(65) Prior Publication Data
US 2018/0259731 A1    Sep. 13, 2018

(30) Foreign Application Priority Data
Mar. 10, 2017  (FR) ...................... 17 51978

(51) Int. Cl.
*G02B 6/42* (2006.01)
*H01R 13/508* (2006.01)
*H01R 13/66* (2006.01)
*H01R 13/6596* (2011.01)

(52) U.S. Cl.
CPC ........... *G02B 6/4271* (2013.01); *G02B 6/423* (2013.01); *G02B 6/428* (2013.01); *G02B 6/4246* (2013.01); *G02B 6/4284* (2013.01); *H01R 13/508* (2013.01); *H01R 13/6658* (2013.01); *H01R 13/6596* (2013.01)

(58) Field of Classification Search
None
See application file for complete search history.

(56) References Cited

U.S. PATENT DOCUMENTS

| | | | | |
|---|---|---|---|---|
| 5,940,269 | A * | 8/1999 | Ko | ........................ H01L 23/467 165/122 |
| 6,430,053 | B1 | 8/2002 | Peterson et al. | |
| 6,765,794 | B1 * | 7/2004 | Inoue | .................... H01L 23/427 165/80.3 |
| 7,113,406 | B1 * | 9/2006 | Nguyen | .............. H01L 23/4006 165/185 |
| 7,131,859 | B1 | 11/2006 | Zumbrunnen et al. | |
| 8,035,973 | B2 * | 10/2011 | McColloch | .......... G02B 6/4246 361/704 |
| 8,784,139 | B2 | 7/2014 | Durand | |
| 9,170,385 | B2 | 10/2015 | Van Der Mee et al. | |

(Continued)

FOREIGN PATENT DOCUMENTS

| | | |
|---|---|---|
| GB | 2 419 470 A | 4/2006 |
| WO | 2015/148786 A1 | 10/2015 |

OTHER PUBLICATIONS

French Preliminary Search Report dated Nov. 6, 2017 from Corresponding French Application No. FR 1751978.

*Primary Examiner* — Tina M Wong
(74) *Attorney, Agent, or Firm* — Pearne & Gordon LLP

(57) ABSTRACT

The application defines a suitable active thermal interface between the optoelectronic or electronic transceiver and the outside environment that is perfectly integrated into the plug or the connection receptacle.

15 Claims, 4 Drawing Sheets

(56) References Cited

U.S. PATENT DOCUMENTS

| | | | | |
|---|---|---|---|---|
| 2006/0086485 A1* | 4/2006 | Meadowcroft | ...... | G02B 6/4201 |
| | | | | 165/122 |
| 2006/0291171 A1* | 12/2006 | Ahrens | ................ | G02B 6/4292 |
| | | | | 361/716 |
| 2014/0369651 A1 | 12/2014 | Ben David et al. | | |
| 2015/0198776 A1 | 7/2015 | Ben David et al. | | |
| 2017/0005446 A1* | 1/2017 | Regnier | ............. | H01R 12/7005 |
| 2018/0259731 A1* | 9/2018 | Dupeux | ................ | G02B 6/423 |

\* cited by examiner

ASSEMBLY FOR CONNECTING A PLUG TO AN ELECTRONIC DEVICE HOUSING PANEL BASEPLATE, INTEGRATING A THERMAL REGULATION MEANS, AND ASSOCIATED PLUG AND BASEPLATE

The present application claims priority to French Patent Application No. 17 519 78, filed Mar. 10, 2017. The contents of this application are incorporated herein by reference in its entirety.

TECHNICAL FIELD

The present invention relates to an assembly for connecting a plug to a receptacle of a housing panel of an electronic device.

The plug is intended to be mounted on at least one cable bearing one or more contacts, which are an optoelectronic converter interface, also called a transceiver, of SFP/SFP+, QSFP/QSFP+ or XFP type, or else an electronic transceiver interface of RJ45 type.

The invention is applicable to plugs for connection to receptacles of electronic devices that implement a plurality of optical and/or electrical paths with connections, such as are found in an outdoor environment and/or in severe conditions, in particular in telecommunications installations such as relay antennas in mobile telephony, in high-throughput data transmission networks to housing or industry, in surveillance camera networks, or else for the transmission of data in railway installations.

The applications that are targeted in particular by the invention are the connection of telecommunications devices, such as base stations with a QSFP/QSFP+ optoelectronic transceiver in a remote radio head (RRH) for the wireless communications market.

The invention aims to prevent the shutdown of optoelectronic or electronic transceiver(s) integrated into the plug of a connection assembly on account of significant heat to which it is subjected during its own operation and/or during the operation of the electronic device.

The invention also consists in being able to reversibly heat the environment of the transceiver so as to keep it within its operating range in an excessively low-temperature environment.

Although described with reference to a QSFP/QSFP+ optoelectronic transceiver, the invention is applicable to any connection assembly with another type of transceiver, such as an electronic transceiver of RJ45 type.

PRIOR ART

It is known to use optoelectronic transceivers equipped with connection means such as described for example in patent U.S. Pat. No. 6,430,053. This optoelectronic transceiver is able to be borne by a receptacle connected to a printed circuit board, such as described for example in application U.S. Pat. No. 8,784,139.

The applicant has proposed, in patent U.S. Pat. No. 9,170,385 B2, integrating an optoelectronic transceiver within a plug, with the option of dismantling the latter for the sake of interchangeability. This solution in particular has the significant advantage that the optoelectronic transceiver does not generate heat in a remote radio head (RRH) of a base station, i.e. on the side of the electronic device around the printed circuit board.

It turns out however that using such a plug as a transceiver with a transceiver of QSFP/QSFP+ type in a remote radio head (RRH) of a base station produces a large amount of heat. In addition, the other components of the device generally themselves generate a large amount of heat. The typical temperature is in the region of 84 to 95° C. in the environment on the part of the electronic device around the printed circuit board.

Now, a QSFP/QSFP+ optoelectronic transceiver is designed to be able to operate up to a temperature of the order of 70° C. At this temperature and beyond, a protective safety mechanism of the transceiver will stop it operating, and the RRH head will cease to transmit data. Furthermore, the lower operating temperature limit for this kind of transceiver is generally 0° C., and it will not operate correctly at temperatures lower than this.

One solution could consist in integrating a cooling apparatus into the inside of the electronic device, i.e. on the side of the electronic circuit board, but such an apparatus would be too bulky and expensive. It would also be ineffective as the frame of the device alone would not be sufficient to dissipate the heat generated by all of the components to the outside of the device.

By contrast, when the environment outside the electronic device is at very low temperatures, there remains a risk of the optoelectronic transceiver or electronic transceiver no longer being within its operating temperature range.

There is therefore a need to improve the assembly for connecting a plug to an optoelectronic or electronic transceiver, integrated into a housing receptacle of an electronic device, in particular of a remote radio head (RRH) of a base station, in order to completely or partly rectify the above-mentioned drawbacks of the prior art, in particular for the purpose of preventing the stoppage of the transmission of data by the RRH head on account of the large amount of heat generated by the electronic device and/or the transceiver or on account of the low temperatures of the environment outside the electronic device.

The aim of the invention is to at least partly meet this need.

DISCLOSURE OF THE INVENTION

To this end, the invention relates to a connection assembly comprising:
  at least one plug, intended to be mounted on at least one cable one end of which bears one or more contacts, comprising a body comprising:
    a front part that extends along a longitudinal axis (X), the front part being designed to house and hold at least one optoelectronic or electronic transceiver connected to the contact(s) of the cable;
    a rear part forming a sheath, designed to house that end of the cable bearing the contact(s) itself;
  at least one receptacle in which the front part of the plug body is housed when the optoelectronic or electronic transceiver of the plug is connected to the contact(s) borne by an electronic circuit board of an electronic device;
  at least one active thermal regulation means, housed and held either in the front part of the plug body or in the receptacle, the active thermal regulation means being designed to prevent the transceiver from being located outside of its operating temperature range in the configuration in which it is connected to the contacts of the electronic board, during operation of the electronic device.

The term 'active thermal regulation means' is understood to mean, at the least, a heat exchanger. It may also comprise its control system. It is specified that, within the meaning of the invention, an active thermal regulation means makes it possible to force the flow of air or of another heat transfer fluid inside the front part of the plug body or of the receptacle.

In other words, the invention defines a suitable active thermal interface between the optoelectronic or electronic transceiver and the outside environment that is perfectly integrated into the plug or the connection receptacle.

By virtue of installing the active thermal regulation module according to the invention, any untimely shutdown, malfunction or damaging of the optoelectronic or electronic transceiver is prevented, either when it is positioned in an environment outside of its thermal operating range, or when it is overheated by the environment on the side of the electronic circuit board of the electronic device or its own generation of heat, or when it is positioned in a low-temperature outdoor environment. The temperature at the transceiver may be detected by the integrated function of the transceiver, or by the integrated function of the Peltier module, or by adding an independent temperature sensor as close as possible to the transceiver, particularly when the transceiver is not yet activated.

The system for controlling the active regulation module may thus be linked to a temperature sensor arranged outside the transceiver.

Actuating the thermal regulation module preferably makes it possible to prevent the tripping of the self-protection mechanism of the optoelectronic or electronic transceiver.

As a result, the active thermal regulation module makes it possible to prevent any interruption in the transmission of data by an RRH head that is equipped with a connection assembly according to the invention.

It is easily possible to design the thermal regulation module and the electric power supply it may have such that it becomes active before the maximum operating temperature of the optoelectronic or electronic transceiver, typically of the order of 70° C. for a QSFP/QSFP+ module and of 85° C. for an SFP/SFP+ module.

If the thermal regulation module has operation that is reversible by reversing the polarity of its power supply, it is easily possible to design the module such that it becomes active before reaching the minimum operating temperature of the transceiver, typically 0° C.

Integrating the active thermal regulation module within the receptacle or the plug itself is achieved with little or no change to the external dimensions of the plug or of the receptacle, thereby thus making it possible still to be able to achieve the desired connections in an environment that is restricted and/or difficult to access.

Integrating the active thermal regulation module within the receptacle or the plug itself avoids having to redefine the electronic device and in particular having to redesign the electronic board layout, since only one potential electric power supply needs to be provided on the latter for the module.

The optoelectronic transceiver is advantageously of SFP/SFP+, QSFP/QSFP+ or XFP type.

According to one advantageous embodiment, the active thermal regulation means is a Peltier module supplied with electric power from the electronic circuit board. The term 'Peltier module' is understood in this case and in the context of the invention to have its usual technological meaning, namely a component that implements thermoelectricity through the Peltier effect and that is supplied with a current so as to transform it into a temperature difference. In the context of the invention, the so-called cold face bears flat directly against the optoelectronic transceiver or indirectly against an exchange surface that is itself in conduction with the transceiver, whereas the other so-called hot face is oriented toward the outside environment. When the polarity of the Peltier module is reversed, the face bearing flat against the transceiver is then called the hot face, while the face that is then called the cold face is oriented toward the outside, in conformity with the reversible operating mode of the module.

According to this embodiment and one advantageous variant of integration into the receptacle:
the front part of the plug body comprises a surface for exchanging heat through conduction with the optoelectronic or electronic transceiver housed and held inside the front part;
the receptacle comprises holding rails for holding the Peltier module.

The receptacle preferably houses a compressible element made of thermally conductive material and designed to apply a force to the Peltier module that is held in the rails, so as to make the latter bear flat against the heat exchange surface of the front part. It also makes it possible to compensate for form defects, such as planarity or roughness defects between the surfaces in contact, and therefore to optimize the transfer of heat to the outside.

According to one advantageous variant of integration into the plug, the Peltier module is housed and held in a cavity in the front part of the plug body and bears flat against the optoelectronic transceiver.

A compressible element made of thermally conductive material is then preferably housed in the receptacle, the compressible element being designed to apply a force to the Peltier module housed in the plug, so as to make the latter bear flat against the optoelectronic transceiver. It also makes it possible to compensate for form defects, such as planarity or roughness defects between the surfaces in contact, and therefore to optimize the transfer of heat to the outside. This compressible element may for example be made of silicone loaded with ceramic particles.

Instead of a Peltier module, the active thermal regulation means may be based on the flow of a heat transfer fluid or any other type of active heat pipe. It is also possible to combine a heating resistor with the Peltier module to add to the effectiveness of the heating of the transceiver if necessary.

The receptacle advantageously comprises, on its outer periphery, a plurality of cooling fins designed to evacuate the heat that is itself evacuated by the active thermal regulation module into the outside environment. Thus, by virtue of these cooling fins, the heat from the optoelectronic transceiver, evacuated by the active thermal regulation module, is dissipated more easily and quickly into the outside environment.

According to one variant implementation, the optoelectronic transceiver(s) may project beyond the front part.

According to one advantageous embodiment, the assembly comprises a plurality of flexible tabs made of electrically conductive material and distributed on the outer periphery of the front part (3), the flexible tabs being designed to remain in mechanical contact with the inside of the receptacle when the front part of the body is housed in the latter.

Advantageously, the plurality of flexible tabs form an apparatus for protecting against electromagnetic interference (EMI) and/or advantageously also a lightning strike. The flexible tabs thus provide perfect ground continuity and/or electromagnetic shielding. Ground continuity is preferably able to be ensured by way of a metal braid fastened around the cable on which the plug is mounted and linked to ground potential at its opposite end.

According to one variant implementation, the flexible tabs may be borne by a ring that is made of electrically conductive material and mounted so as to be able to slide around the front part of the plug body.

As an alternative, the plurality of flexible tabs may be formed integrally with the front part of the body, that is to say as a single component.

As another alternative, the plurality of flexible tabs may be formed in an annular component arranged around the cavity in the receptacle and intended to be positioned between the latter and the electronic device panel.

This component may also make it possible to electrically connect the receptacle to the frame if a thermally insulating and electrically insulating gasket is inserted between this panel and the receptacle.

For grounding and/or electromagnetic shielding purposes, the front part, the optional ring bearing the flexible tabs or the annular component arranged on the receptacle may be made of metal, for example of die-cast zamak or aluminum, coated with an anticorrosive and electrically conductive protective coating or else made of plastic(s) with metallization.

According to one advantageous embodiment, the plug comprises a lever for locking to a receptacle, the locking lever being mounted pivotably on the rear part of the plug body, the lever comprising two locking hooks distributed on either side of the rear part and intended to interact with two locking lugs distributed on either side of the receptacle.

According to one advantageous variant implementation, the plug may comprise a gasket borne by the front part or by the rear part of the plug body.

This gasket is designed to create sealtightness at the interface between the plug and the receptacle in which the front part of the plug body is intended to be housed. Perfect sealtightness at the interface between plug and receptacle is ensured with such a gasket.

Furthermore, when the plug is locked onto the receptacle, the locking force is able to be transmitted effectively and uniformly to the gasket so as to compress it. The gasket may preferably be borne by the ring bearing the flexible tabs.

According to one advantageous feature, the front part of the plug body includes means for holding the optoelectronic transceiver in a detachable manner.

The invention also relates to a plug, intended to be mounted on at least one cable one end of which bears one or more contacts, comprising a body comprising:
  a front part that extends along a longitudinal axis (X), the front part being designed to be housed in a receptacle, the front part being designed to house and hold at least one optoelectronic or electronic transceiver connected to the contact(s) of the cable;
  a rear part forming a sheath, designed to house that end of the cable bearing the contact(s) itself;
  at least one active thermal regulation means, housed and held in the front part of the plug body.

The invention relates lastly to a receptacle intended to house the front part of the body of a plug, in which at least one active thermal regulation means is housed and held.

DETAILED DESCRIPTION

Other advantages and features of the invention will become more apparent upon reading the detailed description of exemplary implementations of the invention, given by way of nonlimiting illustration, and with reference to the following figures, in which:

FIG. 1 is a perspective view of a first exemplary connection assembly according to the invention, with a plug integrating an optoelectronic transceiver of 'QSFP/QSFP+' type in a configuration in which it is connected and locked to a receptacle of an electronic device housing panel, the optoelectronic transceiver of the plug being connected to the contact of the electronic component mounted on the surface of the printed circuit board of the electronic device, the receptacle housing and holding a Peltier module according to the invention supplied with power from the printed circuit board;

Figure 2:
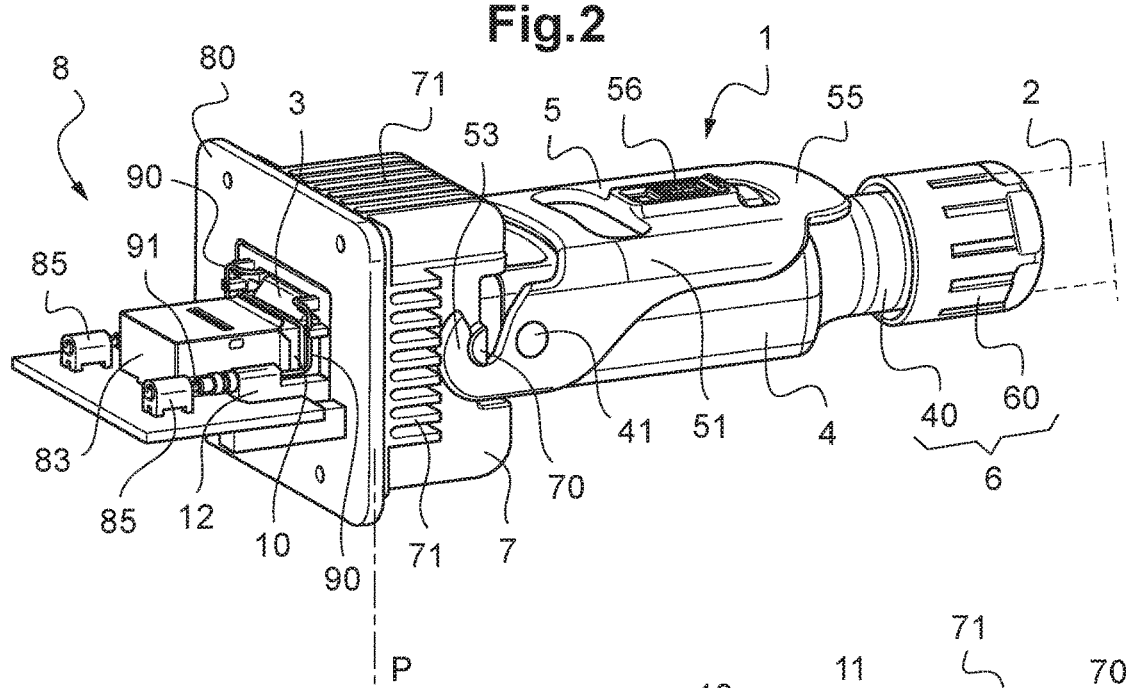
FIG. 2 is a view analogous to FIG. 1, with a different electric power supply for the Peltier module.
Figure 8:
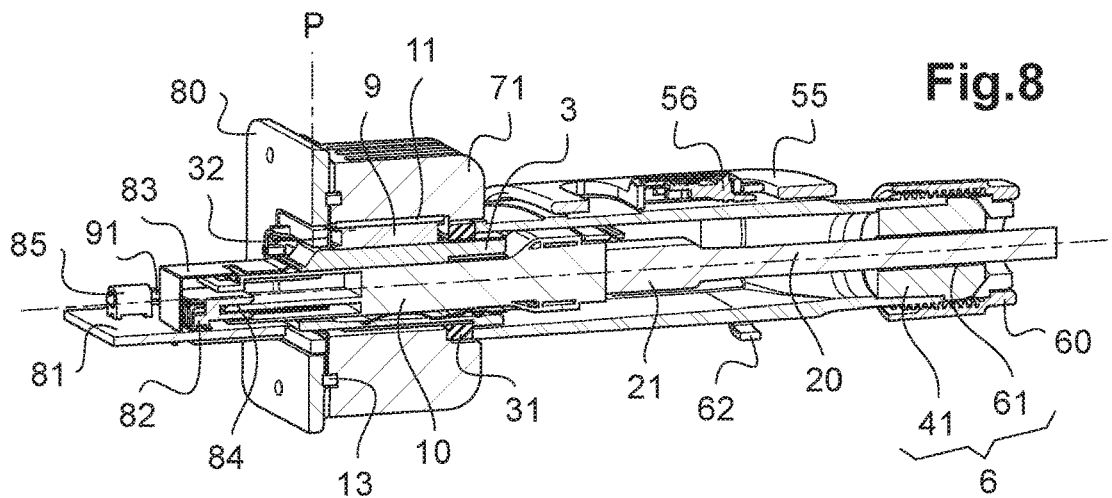
Figure 9:
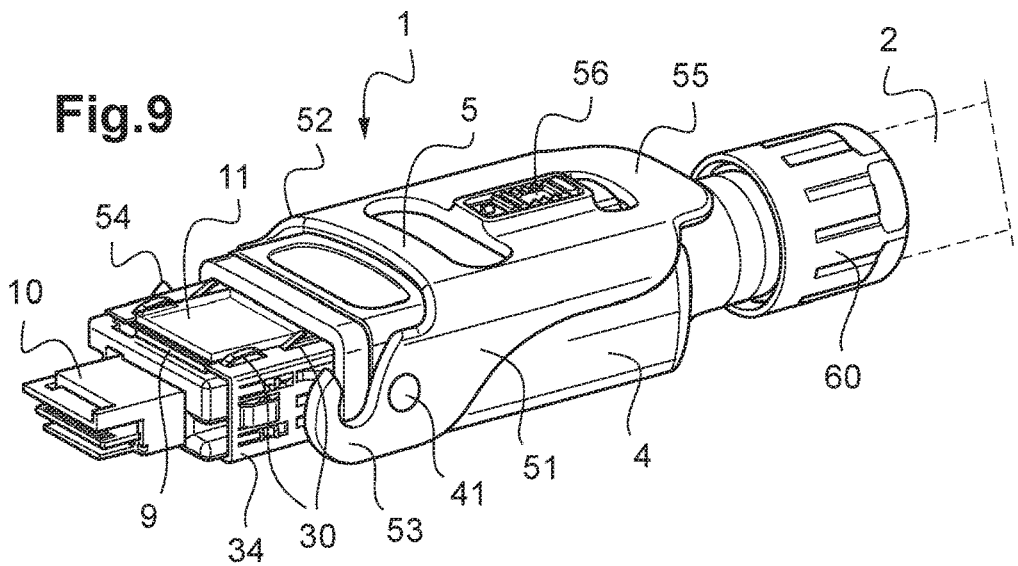
Figure 10:
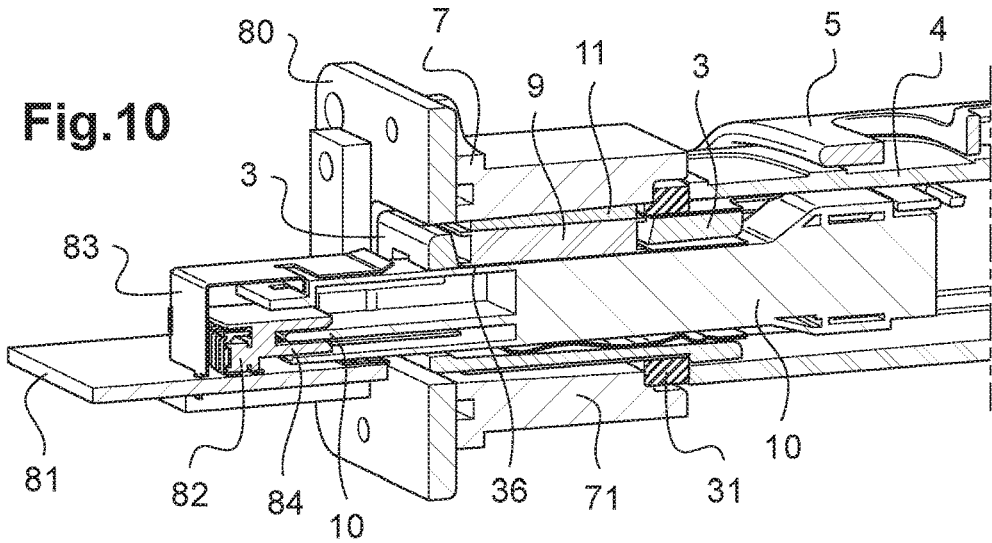

FIG. 8 is a longitudinal sectional view of the connection assembly according to the first example of FIG. 2, with the plug in a configuration in which it is connected and locked to a receptacle of an electronic device housing panel, the optoelectronic transceiver of the plug being connected to the contact of the electronic component mounted on the surface of the printed circuit board of the electronic device, the receptacle housing and holding a Peltier module according to the invention supplied with power from the printed circuit board;

FIG. 9 is a perspective view of a second exemplary connection assembly according to the invention, with a plug integrating an optoelectronic transceiver of 'QSFP/QSFP+' type in a configuration in which it is connected and locked to a receptacle of an electronic device housing panel, the optoelectronic transceiver of the plug being connected to the contact of the electronic component mounted on the surface of the printed circuit board of the electronic device, the plug housing and holding a Peltier module according to the invention intended to be supplied with power from the printed circuit board;

FIG. 10 is a longitudinal sectional view of the connection assembly according to the second example of FIG. 9, with the plug in a configuration in which it is connected and locked to a receptacle of an electronic device housing panel, the optoelectronic transceiver of the plug being connected to the contact of the electronic component mounted on the surface of the printed circuit board of the electronic device, the plug housing and holding a Peltier module according to the invention intended to be supplied with power from the printed circuit board.

For the sake of clarity, the same references denoting the same elements of a plug, receptacle and electronic device according to the invention are used for all of FIGS. 1 to 10.

It is specified that the terms 'front' and 'rear' refer to a plug according to the invention. The front part of the plug body is thus the one situated on the side of the interface with the receptacle, whereas the rear part is the one situated on the side via which the cable/cord is housed and held in the plug.

FIGS. 1 to 8 show a first exemplary implementation of an assembly for connecting a plug, denoted overall by 1, to a receptacle 7 applied and fastened to a panel 80 of an electronic device 8 housing configured to receive a plurality of optical, electrical, power or data signals, or any combination of these signals.

Figure 1:
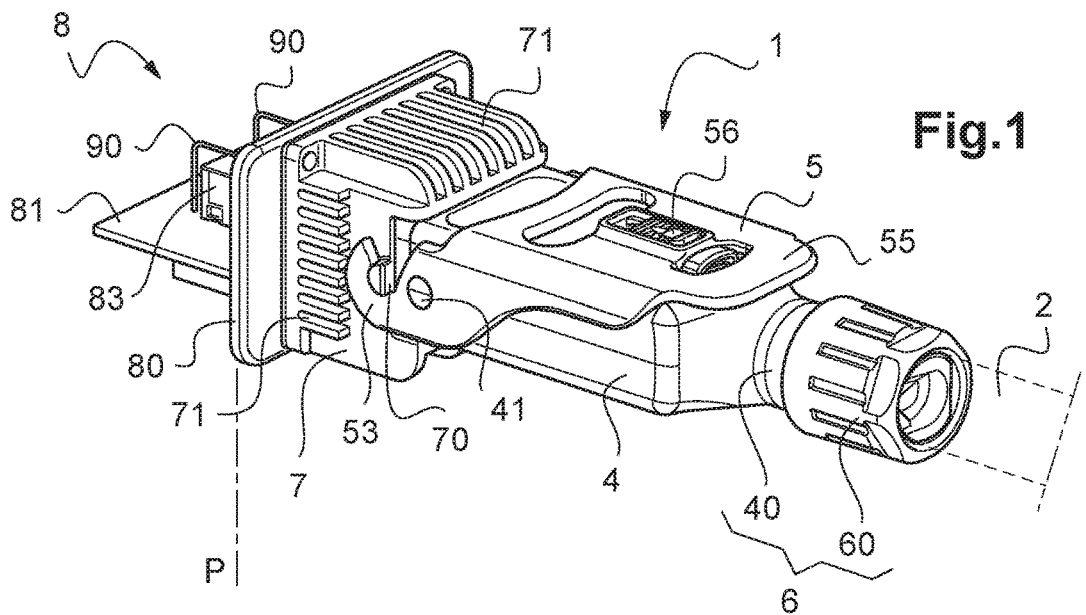

As illustrated in FIGS. 1 and 8, the plug 1 is in a configuration in which it is connected and locked to the receptacle 7, as detailed hereinafter.

The electronic device 8 comprises a printed circuit board 81 on which the electrical interface 82 of the transceiver, protected by a surrounding cage 83, is mounted. The interface 82 is connected to the optoelectronic transceiver 10 of QSFP/QSFP+ type that is integrated into the plug 1.

The plug 1 includes a body that extends along a rectilinear longitudinal axis X and that is made of two components 3, 4, of which one forms the front part 3 in the general shape of a ring and the other forms the rear part 4.

The optoelectronic transceiver 10 may be fastened in a detachable and interchangeable manner inside a recess in the front part 3 of the body provided for this purpose. The transceiver 10 projects beyond the front part 3 of the plug body.

In the example illustrated, the optoelectronic transceiver 10 is in contact with the front part 3 of the body of the plug 1, such that the housing of this optoelectronic transceiver 10 is at the same electrical potential as this front part 3.

One or more optical contacts 21 may be linked at one end to an optical conductor 20, in particular an optical fiber, of a single cable 2, and be connected at their other end to an input of the transceiver 10. The optical contacts 21 are for example contacts of LC type, and the optoelectronic transceiver 10 is for example a transceiver of SFP/SFP+ type. For a QSFP/QSFP+ type, the contacts may also be of MT ferrule type.

The front part 3 of the plug body may be made of electrically conductive material and made for example of die-cast zamak or aluminum, coated with an anticorrosive and electrically conductive protective coating or else made of plastic(s) with or without metallization.

A gasket 31 may advantageously be borne by the front part 3. This gasket 31 makes it possible to create sealtightness at the interface between the plug 1 and the receptacle 7 in which the front part of the plug body is intended to be housed during the connection.

The rear part 4, for its part, forms a sheath designed to house the end of the cable 2 bearing the contacts 21 itself. The rear part 4 may be made of plastic, for example.

The rear part 4 may be mounted so as to float around the front part 3.

As illustrated in FIGS. 1 and 2, a locking lever 5 with two arms 51, 52 is mounted so as to pivot about an axis 41 on the rear part 4 of the body of the plug. The pivot axis 41 may be molded integrally with the rear part 4 of the plug 1 body.

The free end of each arm 51 includes a locking hook 53, 54. The lever 5 may be designed with a grip portion 55 that makes it easily possible to pivot the lever 5 manually about the axis 41.

The plug 1 also includes, in the example described, a cable gland 6 for holding the cable 2. The cable gland comprises a nut 60, for example made of plastic, intended to screw onto the rear part 40 of the body of the plug 2 and compress a gasket 61.

Figure 5A:
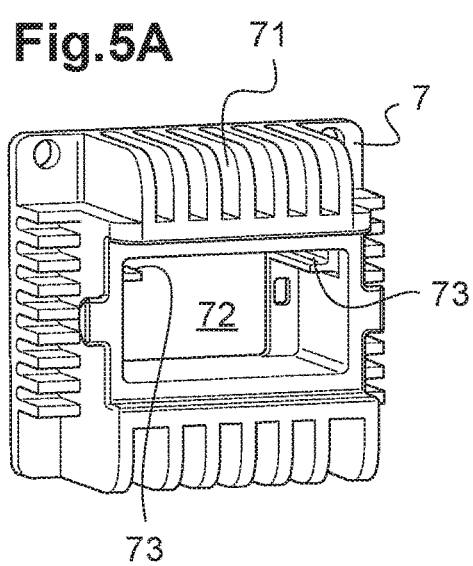
FIGS. 5A and 5B are perspective front and rear views, respectively, of the bare receptacle of FIG. 3, that is to say without the Peltier module, its support and the electric power supply for the module.
Figure 5B:
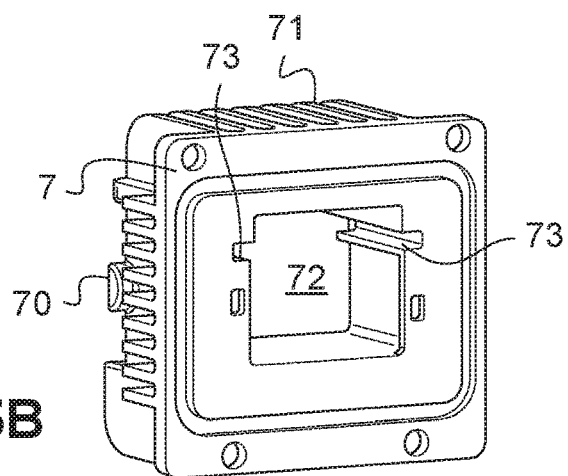

The receptacle 7 shown more precisely in FIGS. 5A and 5B comprises, on its outer periphery, two locking lugs 70 and cooling fins 71. Inside the receptacle 7 there is arranged a cavity 72 in which two guide and holding rails 73 have been formed.

The connection assembly furthermore comprises a plurality of flexible tabs 30 made of electrically conductive material.

These flexible tabs 30 may be formed integrally with the front part 3 of the body while being distributed on the outer periphery of this front part 3.

Figure 3:
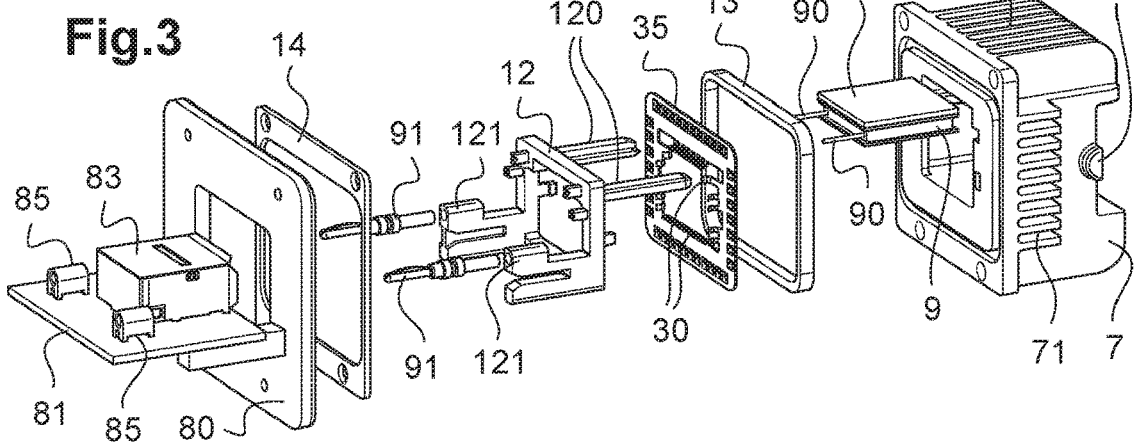
FIG. 3 is an exploded view of the receptacle according to the invention, as shown in FIGS. 1 and 2.
Figure 4A:
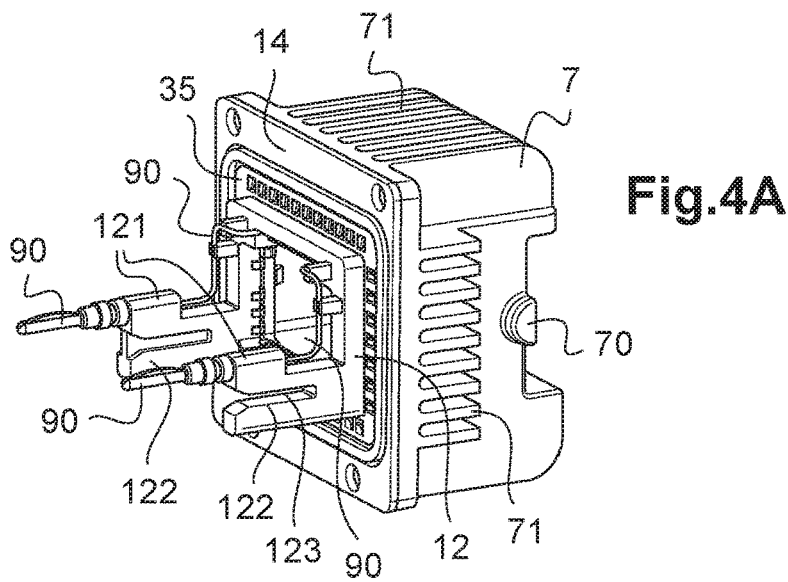
FIGS. 4A and 4B are perspective front and rear views, respectively, of the receptacle of FIG. 3 in which the Peltier module, its support and the electric power supply for the module are housed and held.

As an alternative, they may be formed in an annular component 35 such as shown in FIGS. 3 and 4A, which is arranged around the cavity 72 of the receptacle 7.

These flexible tabs 30 are designed to remain in mechanical contact with the inside of the receptacle 7 when the front part 3 of the body is housed in the latter.

Furthermore, the presence of the flexible tabs 30 ensures without fail the continuity of contact between the front part 3 and the receptacle 7, even in the event of maximum misalignment between the front part 3 and the electronic component 81 borne by the electronic board 82 of the electronic device 8 to which the plug 1 is connected. When they are positioned on the side of the receptacle 7, these tabs 30 furthermore make it possible to connect the receptacle electrically to the panel 80.

According to this first example of the invention, there is provision to integrate a Peltier module 9 within the receptacle 7. The function of this Peltier module 9 is to prevent overheating of the optoelectronic transceiver 10 in the configuration in which its contacts are connected to the contacts 84 of the electronic interface 82 during operation of the electronic device 8.

More particularly, when the electronic device 8 is an RRH head in operation, the temperature inside the housing delineated by the plane P of the panel 80 may exceed the operating range of the transceiver.

Now, at this temperature, there is a risk of the transceiver 10 of QSFP/QSFP+ type no longer operating. Therefore, activating the Peltier module 9 makes it possible to evacuate the heat from the component 10 to the receptacle 7, which receptacle, by virtue of its cooling fins 71, itself enables the dissipation of the heat to the outside environment, that is to say beyond the plane P.

An element 11 made of material that is both compressible and thermally conductive is housed above the Peltier module 9. This element 11 makes it possible firstly to ensure thermal continuity between the Peltier module 9 and the outside 71 of the receptacle 7 and secondly, by virtue of its compressibility, to press the Peltier module 9 against a heat exchange surface 32 provided for this purpose on the front part 3 of the plug 1 body. It also makes it possible to compensate for form defects, such as planarity or roughness defects between the surfaces in contact, and therefore to optimize the transfer of heat to the outside.

Figure 6:
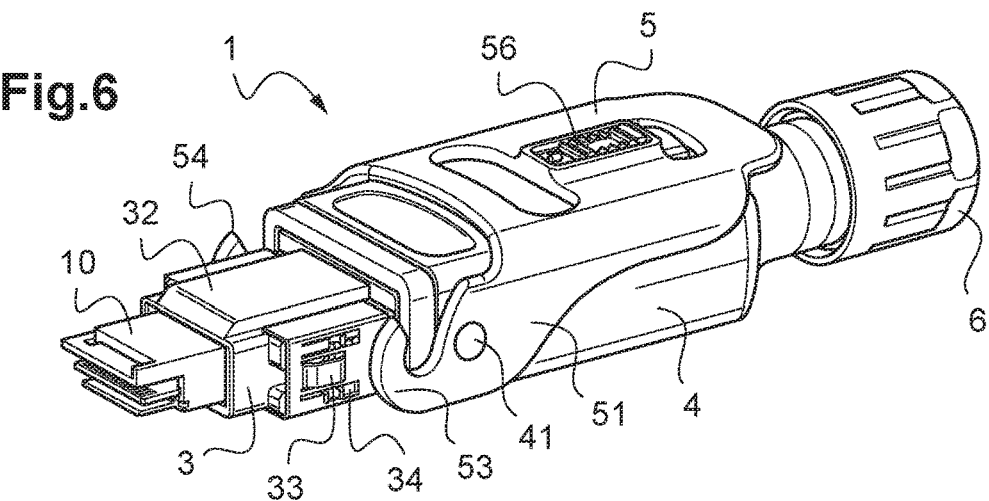
FIG. 6 is a perspective view of the plug of the connection assembly according to FIGS. 1 and 2.

As shown in FIG. 6, this heat exchange surface makes it possible to ensure, through conduction, the dissipation of heat from the optoelectronic transceiver 10 to the cold face of the Peltier module 9, which cold face therefore bears flat against said heat exchange surface. In the event of operation in an environment with a temperature lower than the operating range of the transceiver, the Peltier module 9 has reversible operation: thus, by reversing the polarity of its power supply, it transfers heat to the transceiver 10.

The electric power for the Peltier module 9 is supplied from the printed circuit board 81, either by directly soldering electric power supply wires 90 thereto (FIG. 1) or by way of power pins 91 linked to the Peltier module 9 by electric power supply wires 90 (FIGS. 2, 3, 4A, 4B, 7A and 7B).

Figure 4B:
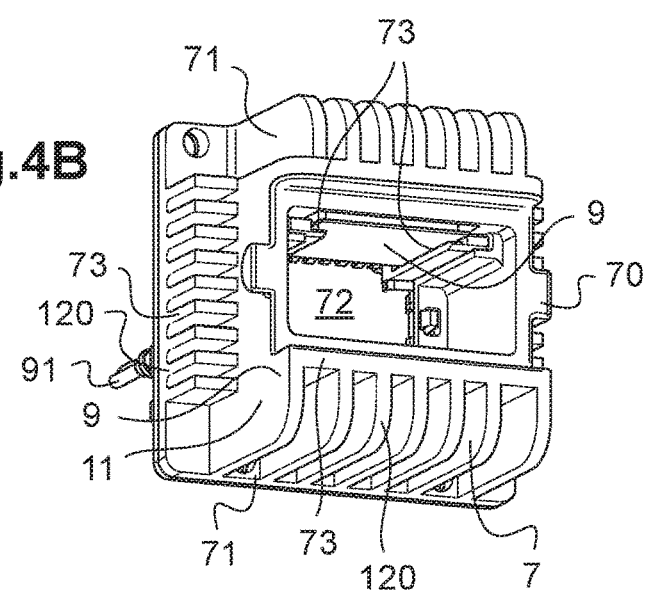

More precisely, the Peltier module 9 is inserted into the guide and holding rails 73 of the receptacle 7. It is held by the housing arms 120 of a support component 12 that is also inserted into the rails 73 of the receptacle 7 (FIGS. 3 and 4B).

This support component 12 also comprises two recesses 121 in each of which one of the two power pins 91 is mounted (FIG. 3).

This support component 12 lastly comprises two guide arms 122 below and parallel to the arms 120. In the example illustrated, one of the two guide arms 122 is joined to one of the housing arms 120, whereas the other arm 122 is separated from the other housing arm 122 by a guide slot 123 the height of which corresponds is at least equal to the thickness of the printed circuit board 81 (FIG. 4A).

A gasket 13 may advantageously be borne by the receptacle 7. This gasket 13 makes it possible to create sealtightness at the interface between the receptacle 7 and the panel 80 of the electronic device to which the receptacle 7 is fastened (FIG. 3).

A spacer plate 14 may be provided between the receptacle 7 and the panel 8, so as to thermally insulate the panel from the receptacle and thus prevent heat from propagating from the device to the receptacle and the transceiver.

Figure 7A:
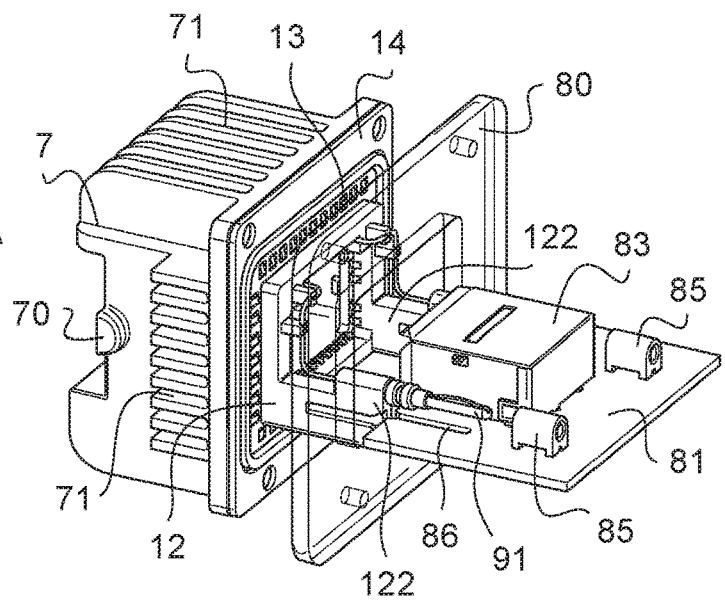
FIGS. 7A and 7B show a perspective view of the various steps of connecting the receptacle according to FIG. 3 to an electronic device housing panel, and the connection of the electric power supply for the Peltier module.
Figure 7B:
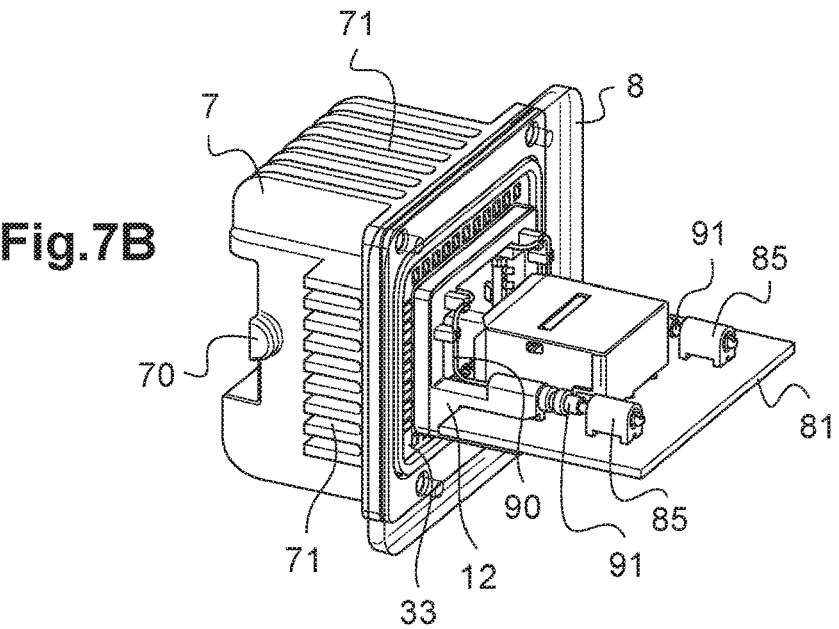

A description is now given of the operations of mounting the receptacle 7 on a panel 80 of the device with the connection of the power supply pins 91 with reference to FIGS. 7A and 7B.

The operator brings the receptacle 7 so as to face the orifice of the panel 80 while aligning the power supply pins 91 of the Peltier module 9 with the complementary female terminals 85 provided for this purpose on the printed circuit board 81.

The guide arms 122 make it possible to guide the receptacle 7 relative to the board 81: thus, on one lateral side of the receptacle 7, the board 81 is inserted into the guide slot 123, whereas, on the other lateral side, the solid joining part between the housing arm 120 and the guide arm 122 is inserted into a guide slot 86 formed in the thickness of the board 81.

Once the pins 91 have been connected in the female terminals 85, the receptacle 7 is fastened by screwing onto the panel 80.

In this configuration, the Peltier module 9 is operational. The latter is able to be triggered at will by the supply of electric power from the female terminals 85 and then by way of the pins 91 and the power supply wires 90 that are linked to the Peltier module 9.

Also in this configuration, in contact the flexible tabs 30 borne by the annular component 35 are in contact with the inner receptacle 7 wall and the panel 80.

Once the receptacle 7 has been fastened to the Peltier module 9 housed and held inside the former, the user is able to connect and lock a plug 1 to the receptacle 7.

The user brings the assembled plug 1 so as to face the receptacle and then houses the front part 3 in the receptacle 7, so as to establish a connection between the transceiver 10 and the contacts 84 of the electronic component 82 borne by the printed circuit board 81 of the electronic device 8 (FIG. 8).

The user then pivots the locking lever 5 of the plug so as to engage the locking lugs 70 of the receptacle 7 with the locking hooks 53, 54 of the lever 5. The plug 1 is then locked to the receptacle 7.

The user then blocks the locking lever in the position locking the plug 1 to the receptacle 7, by sliding a blocking tongue 56 toward the rear of the plug 1. Sliding the blocking tongue 56 brings about movement thereof from its unblocking position to its blocking position in which it is inserted into a portion 62 of the rear part 4 of the plug body.

Thus, according to this first example of the invention, as is visible in FIG. 8, the Peltier module 9 integrated into the receptacle 7 is able to be triggered at will from the electronic board 81 by the electric power supply 85, 91, 90 and thus evacuate heat from the exchange surface 32 in contact with the optoelectronic transceiver 10 to the conductive element 11 and then, through conduction, to the cooling fins 71 of the receptacle 7.

FIGS. 9 and 10 show a second exemplary implementation of the invention, according to which the Peltier module 9 is this time housed and held in the plug 1.

More precisely, the Peltier module 9 is housed in a cavity 36 in the front part 3 of the plug 1 body, and it is held so as to bear flat against the optoelectronic transceiver 10 by way of the thermally conductive element 11. There may be provision to bond the Peltier module 9 directly to the top face of the transceiver 10 by way of a thermally conductive adhesive.

In this example, the plug 1 may comprise a ring 34 made of electrically conductive material that bears the flexible tabs 30 and that is mounted so as to be able to slide around the front part 3 of the body.

In this second example, although not shown, electric power is supplied to the Peltier module 9 directly from the printed circuit board 81 like in the first example, that is to say by electric power supply wires 90 by way of pins on the plug that are coupled to female terminals on the printed circuit board.

The invention that has just been described makes it possible to ensure without fail that the optoelectronic transceiver 10 is cooled by way of the Peltier module 9, which is able to be triggered at will from the electronic device 8. The operation of the latter is thus guaranteed, even in the event of a high temperature, typically beyond 80° C. in its internal environment delineated by the panel 80.

The plugs and the receptacles according to the invention to which said plugs may be connected may be configured to operate at temperatures of between −40° C. and +125° C.

In terms of sealtightness, the plugs and/or the receptacles according to the invention may comply with the standard IP65, IP67, IP68, or UL50E.

Regardless of the embodiment, the Peltier module 9 according to the invention is integrated into the plug 1 or into the receptacle 7 of the connection assembly while being self-supported and while bearing flat either directly against the transceiver 10 of QSFP type to be cooled or indirectly by way of the heat exchange surface 32 of the front part 3 of the plug body.

Other variants and advantages of the invention may be realized without otherwise departing from the scope of the invention.

The invention is not limited to the examples that have just been described; it is possible in particular to combine features of the examples illustrated with one another in variants that are not illustrated.

The invention claimed is:

1. A connection assembly comprising:
   at least one plug, intended to be mounted on at least one cable one end of which bears one or more contacts, comprising a body comprising:
   a front part that extends along a longitudinal axis (X), the front part being designed to house and hold in a detachable and interchangeable manner at least one optoelectronic or electronic transceiver connected to the contact(s) of the cable;
   a rear part forming a sheath, designed to house that end of the cable bearing the contact(s) itself;
   a cable gland configured for holding the cable;
   at least one receptacle to which the front part of the plug body is connected in a detachable and interchangeable manner, the front part of the plug body being within the receptacle when the optoelectronic or electronic transceiver of the plug is connected to the contact(s) borne by an electronic circuit board of an electronic device; and
   at least one active thermal regulation means, housed and held either in the front part of the plug body or in the receptacle, the active thermal regulation means being designed to prevent the optoelectronic or electronic transceiver from being located outside of its operating temperature range in the configuration in which it is connected to the contacts of the circuit board, during operation of the electronic device.

2. The connection assembly according to claim 1, wherein the system for controlling the active regulation module is linked to a temperature sensor arranged outside the transceiver.

3. The connection assembly according to claim 1, wherein the optoelectronic transceiver is of SFP/SFP+, QSFP/QSFP+ or XFP type.

4. The connection assembly according to claim 1, wherein the active thermal regulation means is a Peltier module supplied with electric power from the electronic circuit board or by the electrical conductors of the cable coming from the rear part of the plug.

5. The connection assembly according to claim 4, wherein:
   the front part of the plug body comprises a surface for exchanging heat through conduction with the transceiver housed and held inside the front part;
   the receptacle comprises holding rails for holding the Peltier module.

6. The connection assembly according to claim 5, wherein the receptacle housing a compressible element made of thermally conductive material and designed to apply a force to the Peltier module that is held in the rails, so as to make the latter bear flat against the heat exchange surface of the front part.

7. The connection assembly according to claim 4, wherein the Peltier module is housed and held in a cavity in the front part of the plug body and bearing flat against the optoelectronic transceiver.

8. The connection assembly according to claim 7, comprising a compressible element made of thermally conductive material, arranged between the receptacle and the optoelectronic transceiver, the compressible element being designed to apply a force to the Peltier module so as to make the latter bear flat against the optoelectronic transceiver.

9. The connection assembly according to claim 1, wherein the receptacle comprises, on its outer periphery, a plurality of cooling fins designed to evacuate the heat that is itself evacuated by the active thermal regulation module into the outside environment.

10. The connection assembly according to claim 1, comprising a plurality of flexible tabs made of electrically conductive material and distributed on the inner periphery of a cavity in the receptacle, the flexible tabs being designed to remain in mechanical and electrical contact with the periphery of the front part when the front part of the body is housed in the receptacle.

11. The connection assembly according to claim 1, comprising a plurality of flexible tabs made of electrically conductive material and distributed on the outer periphery of the front part, the flexible tabs being designed to remain in mechanical and electrical contact with the inside of the receptacle when the front part of the body is housed in the receptacle.

12. The connection assembly according to claim 11, wherein the plug comprises a ring made of electrically conductive material and mounted so as to be able to slide around the front part of the body, the ring bearing the flexible tabs.

13. The connection assembly according to claim 11, wherein the plurality of flexible tabs are formed in an annular component arranged around the cavity in the receptacle.

14. The connection assembly according to claim 1, wherein the front part of the plug includes means for holding the optoelectronic transceiver in a detachable manner.

15. A plug, intended to be mounted on at least one cable one end of which bears one or more contacts, comprising a body comprising:
   a front part that extends along a longitudinal axis (X), the front part being designed to be connected in a detachable and interchangeable manner to a receptacle, the front part being housed in the receptacle when it is connected thereto, the front part being designed to house and hold in a detachable and interchangeable manner at least one optoelectronic or electronic transceiver connected to the contact(s) of the cable;
   a rear part forming a sheath, designed to house that end of the cable bearing the contact(s) itself;
   at least one active thermal regulation means, housed and held in the front part of the plug body.

* * * * *